July 31, 1962  U. VOGEL  3,047,084
SPRING BALANCE OR WEIGHING DEVICE
Filed Feb. 25, 1960  11 Sheets-Sheet 1

July 31, 1962 U. VOGEL 3,047,084
SPRING BALANCE OR WEIGHING DEVICE
Filed Feb. 25, 1960 11 Sheets-Sheet 2

July 31, 1962  U. VOGEL  3,047,084
SPRING BALANCE OR WEIGHING DEVICE
Filed Feb. 25, 1960  11 Sheets-Sheet 7

July 31, 1962 U. VOGEL 3,047,084
SPRING BALANCE OR WEIGHING DEVICE
Filed Feb. 25, 1960 11 Sheets-Sheet 8

July 31, 1962  U. VOGEL  3,047,084
SPRING BALANCE OR WEIGHING DEVICE
Filed Feb. 25, 1960  11 Sheets-Sheet 9

United States Patent Office 3,047,084
Patented July 31, 1962

3,047,084
SPRING BALANCE OR WEIGHING DEVICE
Uwe Vogel, Hamburg-Wellingsbuttel, Germany, assignor to Vogel & Halke, Hamburg, Germany
Filed Feb. 25, 1960, Ser. No. 11,029
Claims priority, application Germany Aug. 17, 1959
16 Claims. (Cl. 177—229)

This invention relates to spring balances, weighing apparatus or the like, in which the bridge carrier is suspended from parallel leaf springs disposed vertically one above the other and having a taring device for taring the balance.

The invention is concerned with a spring balance in which, in the unloaded state of the balance, the ends of the springs facing the bridge carrier are situated at a higher level than the ends of the spring which are fixed on the housing of the balance.

In such balances, the springs are constructed as leaf springs and are relatively narrow, so that the known spring balances operate satisfactorily only when the load is centrally disposed. When the load is moved in the forward or rearward direction from the centre of the support, large indicating errors occur, and increase with increasing load. Since in the case of a unilateral loading of the support additional pushing and tension stresses occur in the leaf springs, the resulting spring form varies in comparison with the sinusoidal spring form occurring in the case of a central load, so that variations occur in the travel and in the indication which is derived therefrom.

The spring balance of the invention preferably has an indicating system provided with a driving pinion and a rack movable in accordance with the load and meshing with the pinion, and has a pull-rod connection between the bridge carrier and the indicating system.

If the load is applied with an impact to the weighing bridge, the inertia of the indicating system, which may be a dial, results in considerable stresses of the transmission elements between the bridge carrier and the indicating system.

The object of the invention is to crease an improved spring balance, operating very accurately, even when the load is disposed off-centre.

A further object of the invention is the construction of a new and improved spring balance with new kinds of adjusting devices comparably easy to use and which especially can be applied at a spring balance also operating accurately when a load is disposed off-centre.

Another object of the invention refers to a spring balance which has improved taring devices in connection with new adjusting devices.

Another object of the invention is the construction of a spring balance the comparably slow indicating system of which is being discharged by sudden movements due to quick impacts through deposition of a weight.

A further object of the invention is the construction of a spring balance which can easily be designed and particularly provides a new position of the pinion for the indicating system which guarantees an exact position with a comparably simple setting.

According to the invention, the effective width of the leaf springs is at least equal to half the width of the load field of the weighing bridge, and the centre of at least the lower leaf spring is formed with an aperture for the passage of a transmission and adjusting element. The opening is preferably provided by constructing the lower leaf spring as a pair of leaf springs. According to a preferred embodiment the invention provides an arrangement of two pairs of springs disposed side by side and spaced apart. This construction provides a wide spring arrangement, using conventional springs, while the pair-wise construction gives particularly advantageous adjustment possibilities. According to one advantageous embodiment, the effective width of the leaf springs, disposed in pairs, corresponds at least to one-third of the width of the load field of the weighing bridge. The effective width of the leaf springs is advantageously approximately equal to the width of the load field.

The said transmission and adjusting element is hereinafter referred to as an adjustment angle arrangement and may be so disposed as to be adjustable in height for operation by means of a taring screw. The adjustment angle arrangement includes a rocking lever for engagement in the rack of the indicating system and an upper pull-rod hook for connection with the so-called bridge carrier. Those elements are adjustable in relation to one another for the purposes of carrying out the adjustment according to the invention in the most diverse manner.

One particularly advantageous embodiment of the invention provides a direct adjustment by the deflection of one or more leaf springs, adjustment springs being provided acting directly on one or more leaf springs through an adjustable range. In such embodiments any transmission linkage, the coupling or connecting parts of which have play or may be subject to wear, are avoided in the adjustment. By the direct action on one or more leaf springs it is possible in these conditions to obtain particularly accurate adjustments.

According to one embodiment of the invention, at least two adjustable adjustment springs disposed symmetrically with respect to the centre of the balance, are provided on the leaf springs. These adjustment springs are shaped preferably to correspond to the leaf springs, that is to say, for example, in the case of rectilinear leaf springs the adjustment springs are constructed as flatsprings.

The adjustment springs may be constructed in the form of strips to be rockable as an eccentric or slidable on the leaf springs at least in one mounting of the leaf springs, for example in a support fixed on the housing and/or on the bridge carrier.

The use of such adjustment springs has a particular influence on the spring characteristic of the leaf springs, especially if the adjustment occurs only at the edge, that is to say near the clamping points. This adjustment arrangement is therefore particularly suitable in the case of a pair-wise construction of the leaf springs.

At least two adjustment springs may be provided, namely in each case on one side of the weighing machine at the top or bottom leaf spring. However, the invention includes the incorporation of a plurality of adjustment springs, such as four, for example, two being provided in each case on each side of the balance at the upper and lower leaf spring. The adjustment springs are so fitted that they are likewise loaded on a deflection of the leaf springs. By way of example, the adjustment springs are adjustable in the longitudinal and transverse direction with respect to the leaf springs. Instead of a narrow strip-shaped embodiment, one adjustment spring may extend in each case over approximately half the width of the weighing machine. It should be pointed out that an adjustment spring may be disposed at each end of a leaf spring.

In order to provide adjustment for any deviations, according to one embodiment, the members constituting the adjustment angle are adjustable about an axis, comprises a pull-rod hook with an axle bearing part, and a rocking lever in engagement with an indicating member and having an axle bearing part which is constructed to be complementary.

Moreover, the accuracy of indication in the event of impacts is considerably improved, by disposing a member, which is capable of being deflected resiliently in the event of an overload, in the transmission, which is preferably pivoted on both sides, between the bridge carrier and the indicating system, preferably the rack.

A feature of the invention is that an adjustable stop is provided in the parts which yield against a spring action in the event of overload, by mutual displacement, turning or rocking, against which stop the two parts, are drawn together for accurated adjustment of the transmission system on indication of the weight.

In known construction, the rack is generally held by a member which is elastic and substantially parallel to the direction of movement of the rack. In these circumstances, a considerable axial force is exerted on the rack, which reduces the accuracy of response. According to the invention, in contradistinction thereto, the rack is suspended from two springs which are disposed substantially in the form of a V in relation to one another, the spring abutments thereof being adjustable.

According to the preferred embodiment of the invention, the clamping strips for the leaf springs are constructed after the style of profiles and have at least one clamping edge facing the spring arms. Said clamping edge is advantageously constructed in the form of a knife-edge. In the case of clamping strips having a U-shaped profile, the second clamping edge facing one spring end may be of blunt construction.

The invention will now be described with reference to the accompanying drawings, in which.

Referring to the drawings wherein like parts have been given like references in corresponding figures, a weighing bridge 1 is disposed on a bridge carrier 2 on which the ends of springs 3, 4 associated with the weighing bridge are fastened.

The other ends of the springs 3, 4 are fastened to the housing by a bracket 5 located at the same distance from the bridge carrier 2. The bearing points for all the spring ends extend horizontally for example in FIGURES 1 and 3. The ends of the springs 3, 4 fixed on the bridge carrier 2 are situated higher than the ends which are disposed on the housing.

Figure 1:
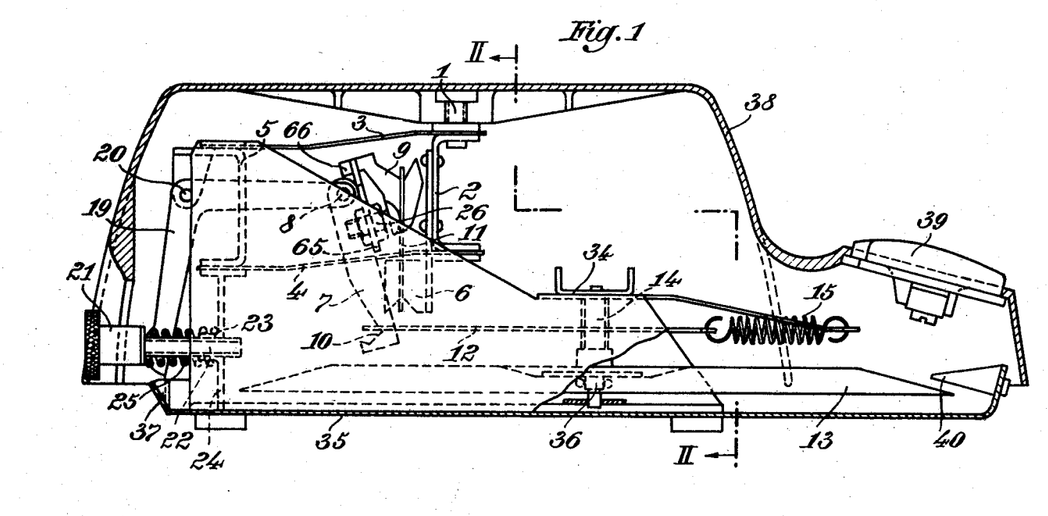
FIGURE 1 is a side view, partially in section, of a balance with a taring device.
Figure 3:
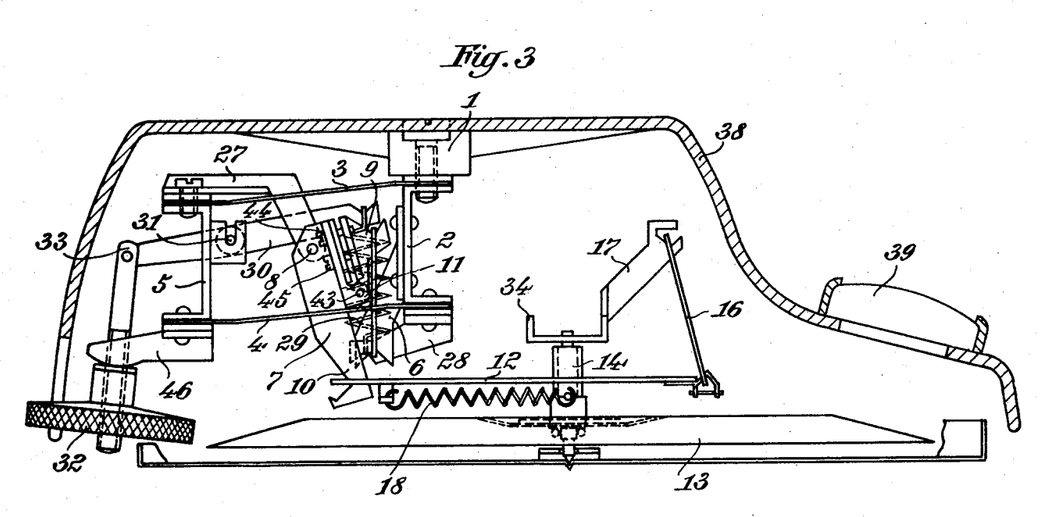
FIGURE 3 is a side view, in partial section, of another embodiment of a balance.

A cup 6 is secured to the bridge carrier 2. A lever 7 is rockably suspended at its upper end on a pivot 8 and has a cup 9 at its upper end and a cup 10 at its lower end. The arrangement is such that the cup 9 lies vertically above the cup 6. A pull-rod 11 is suspended in the cups 9, 6, and the movements of the weighing bridge 1 or of the bridge carrier 2 are transmitted to the rocking lever 7 by way of said pull-rod.

In the cup 10, is suspended a rack 12 which meshes with a pinion 14 on the shaft of a dial 13. The dial 13 is also mounted so as to be rigid on the housing. The rack 12, in the embodiment shown in FIGURE 1, is suspended by its other end from a spring 15, and in the embodiment shown in FIGURE 3, the rack is suspended from the arm 17 by a link 16. In this embodiment, a return spring 18 is situated beneath the rack 12.

In the embodiment shown in FIGURE 1, the rocking bearing, that is to say the pivot 8 of the rocking lever 7, is adjustable in height. In the case of an adjustment of the height of the pivot 8, the rocking lever 7 is therefore rocked under the load by the bridge carrier 2 by way of the pull-rod 11 in such manner that the cup 9 forms substantially a fixed pivot point and the rack 12 is moved for the purposes of taring the balance. It is pointed out that the pinion 14 is made sufficiently long to maintain engagement between the rack and the pinion even in the event of changes of the position of the rack 12.

According to FIGURE 1, the pivot 8 is disposed in an angle lever 19 which is rockable about a pin 20 fixed to the housing. The free end of the lever 19 engages with a taring screw 21, the shank 22 of which is screwed into a threaded bush 23 provided in the housing of the balance.

Between the free end of the rocking lever 19 and the housing 24 of the balance, a spring 25 is provided which presses the lever end against the head of the taring screw 21.

It will be seen that the pivot 8 is raised or lowered by adjusting the taring screw 21, so that at the same time the rocking lever 7 is moved correspondingly.

On rocking the angle lever 19, the pivot 8 is moved over an arc of a circle about the pin 20, so that the mutual adjustment of the cups 6, 9 is altered. In order to render possible accurate adjustment of the cups 9 and 6 in relation to one another at any given time, the cup 9 is disposed movably on the rocking lever 7, provision being made especially for movement in the vertical direction in relation to the connecting line between the pivot 8 and the cup 10. For the respective adjustment of the cup 9, an adjustment screw 26 is provided. The head of the adjustment screw is rigidly connected, for example by soldering, to the part carrying the cup 9. The screw 26 passes through a slot in a bent-off web 65 of the rocking lever 7. In the upper end of this web is another slot, through which passes a projection 66 on the part carrying the cup 9. In this way, adjustment of the cup 9 in a direction parallel to the rocking lever 7 can be effected.

The arrangement shown in FIGURE 3 differs from that above-described, in that the pivot 8 is fixed on the housing so that the position of the rocking lever 7 as regards height is not variable. In the embodiment illustrated, the pivots 8 is fastened on a supporting arm 27. Reference will at the same time be made to FIGURE 4 in order to explain the arrangement.

Figure 4:
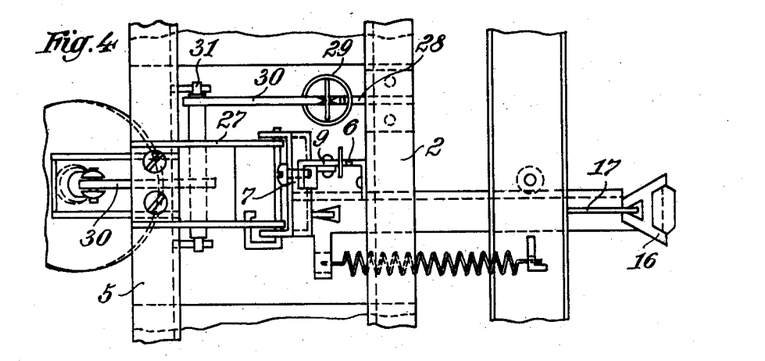
FIGURE 4 is a plan view of the embodiment shown in FIGURE 3.

For the purpose of taring the balance, a special cup 28 is disposed beside the cup 6 on the bridge carrier 2. From this cup is suspended a spring 29, the upper end of which is fastened to a two-armed lever 30 which is rockable about a kin 31 fixed on the housing and the free end of which can be moved by a taring nut 32. The taring nut is disposed on a threaded bolt 33, which is pivotally connected to the free end of the lever 30 and which is passed for example through a fork or a support 46 for the taring nut 32, which support is fixed on the housing and provided with an opening.

By turning the taring nut the taring spring 29 is tensioned in such a manner that it takes the entire tare load, so that, for example, after a vessel has been disposed on the device the scale 13 is brought to zero. The arrangement is such that zeroising is effected by adjustment of the force applied to the weighing bridge by way of the spring 29. In these circumstances, an arrangement may be provided such that the springs 3, 4 are substantially free from stress when the bridge is unloaded.

In this embodiment, the cup 9 is adjustable in relation to the rocking lever 7. The profile part having the cup is rockable at its lower end about a pin 43 which is mounted on the rocking lever 7. The upper end of the profile part in which the cup 9 is formed may be adjusted by means of the screws 44, 45 with respect to the rocking lever 7, so that the distance of the cup 9 from the connecting line between the axis 8 and the cup 10 varies. The screw 44 is a tension screw, while the screw 45 is a compression screw.

FIGURE 1 shows the invention applied to a domestic weighing machine. The parts 5 and 24, and the carrier 34 forming a bearing for the pinion 14, are disposed on the lower part 35 of the weighing machine, on which the bearing 36 for the pinion 14 with the dial 13 is provided. The weighing bridge 1 in this construction is constructed as an upper part 38 of the housing, the side walls of which overlap the drawn-up edge 37 of the lower part. In the upper part 38 of the housing is disposed a viewing window 39, for example with a magnifier, which gives a view of part of the dial 13. In the region of this viewing section a pointer 40 is disposed on the edge 38 of the bottom part.

Figure 2:
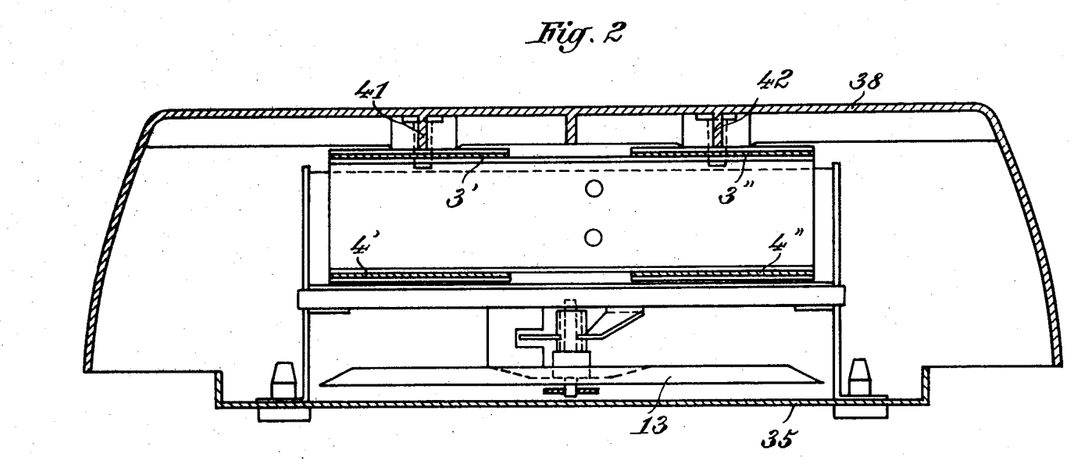
FIGURE 2 is a section on the line II—II of FIGURE 1.

It will be seen from FIGURE 2 that the springs 3, 4 comprise two pairs of springs, which are denoted by references 3', 4' and 3" and 4" respectively. These pairs of springs are disposed so far apart that the suspension of the rocking lever 7 between them has sufficient room. The advantage of the fact that the pairs of springs are disposed far apart is that the weighing bridge 1 is supported at two points 41, 42 which are situated at a distance from one another, the fastening being effected, for example, by the engagement of a screw, passing through the weighing bridge, and engaging a threaded bore in the bridge carrier.

Figures 5, 6, 7:
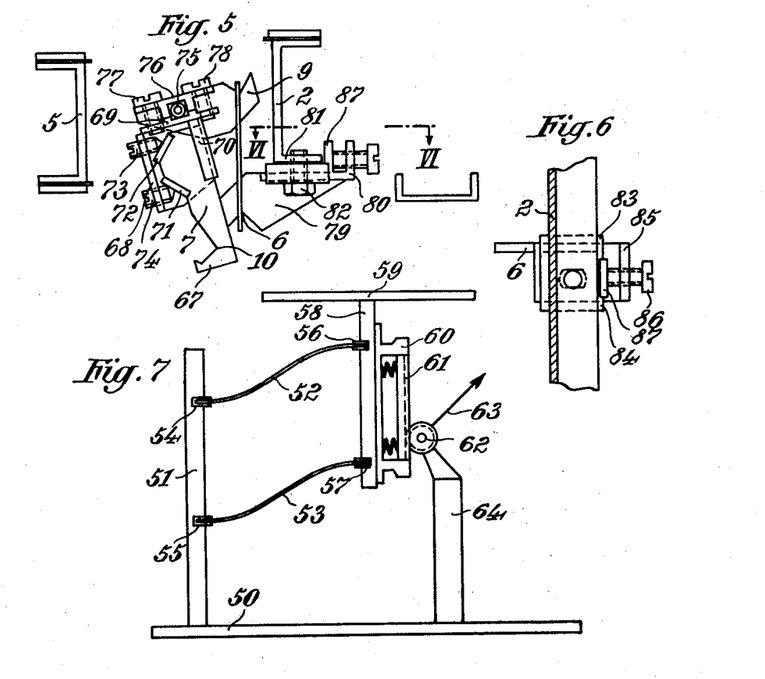
FIGURE 5 is a partial view of the balance system according to the invention illustrating a preferred embodiment of a rocking lever for adjusting the cups.
FIGURE 6 is a section on the line VI—VI of FIGURE 5.
FIGURE 7 is a schematic illustration of a weighing machine according to the invention utilising one embodiment of leaf springs.

To facilitate adjustment of the weighing machine, an arrangement such as shown in FIGURE 5 is provided, only the parts essential for the explanation of the adjustment elements are shown. The parts involved are the rocking lever, which is denoted as a whole by reference number 7 and which is disposed between the bracket 5 and the bridge carrier 2. The rocking lever 7 comprises two parts which are slidable in relation to one another, and of which one 67 has the cup 10 for the rack and the other, 68, a step bearing 69 for the part carrying the cup 9. The parts 68 and 67 are slidable in relation to one another in the longitudinal direction of the rocking lever 7. By means of a flanged-over edge 70 the part 68 engages around the back of the part 67. The latter carries two abutment surfaces 71, 72, which are disposed at a right angle to one another and in each case at an angle 45° to the longitudinal axis of the rocking lever 7, and are inclined at an angle to the back of the rocking lever 7, on which the flanged-over edge 70 is situated. Associated with each abutment surface 71, 72 is a clamping screw 73, 74, which screws are guided in the part 68 of the angle lever. In the arrangement illustrated it is possible, for example by loosening the clamping screw 73 and tightening the clamping screw 74, to reduce the effective length of the rocking lever 7.

The supporting bearing 69 has bearing cups for the rocking axis 75 of the rocking lever 7. The co-acting bearing cups are disposed in a co-acting bearing plate 76 on the part having the cup 9. The co-acting bearing plate 76 is connected to the step bearing 69 by the screws 77, 78. Between the bearing cups and the co-acting bearing cups for the rocking axis 75 there is sufficient clearance to produce a rocking of the co-acting bearing plate 76 in relation to the step bearing 69 and hence of the cup 9 in relation to the rocking lever 7, by different adjustment of the screws 77, 78.

A further adjustment shown in FIGURES 5 and 6 is provided for the cup 6. The cup 6 is disposed in a plate 7 and has a web 80, which extends vertically to the plane of this plate and which is guided on the lower web 81 of the bridge carrier 2. The web 80 has a slot through which a screw 82 passes and is screwed into the lower web 81. In consequence, the adjustment of the cup 6 on the bridge carrier can be fixed, while additional lateral guide pieces 83, 84 may be provided for guiding the cup. The end of the web 80 remote from the cup 6 is provided with a drawn-up part 85, through which passes a screw 86, which is supported on an abutment 87 constructed on the bridge carrier 2. By adjustment of the screw 86, after release of the screw 82, it is thus possible to vary the adjustment of the cup 6 in relation to the bridge carrier 2 and also in relation to the cup 9.

By the arrangement shown in FIGURES 5 and 6 there is provided for the weighing machine an adjustment device which takes into account all possible cases.

In FIGURE 7, in a theoretically different construction of the system, a special construction according to the invention, is shown for the leaf springs, which can also be used in all the other illustrated systems. In FIGURE 7, the fixed part of a weighing machine is denoted by reference 50. It comprises a base plate and a mounting 51 for two springs 52, 53, which are clamped in parallel relationship in horizontal bearing points 54, 55. The other ends of the springs 52, 53 are clamped in horizontal bearing points 56, 57 on the bridge carrier 58 carrying the weighing bridge 59. The bearing points 54 and 55 on the one hand and 56 and 57 on the other hand are situated the same distance apart. To correspond to the amount of their half deflection in the case of full load of the weighing machine, the springs 52, 53 are sinusoidally pre-shaped in the direction opposed to this deflection, so that when the weighing machine is in the non-loaded state the bearing points 56, 57 lie higher than the bearing points 54, 55.

In the schematic illustration, a holder 60 for the rack 61 is provided on the bridge carrier, the pinion 62 meshing with said rack. On the axle of the pinion is disposed the pointer 63. This axle is mounted in an upright 64 on the fixed part 58. It is expressly stressed that other transmission elements may be provided between the bridge carrier and the pointer, and the scale may be disposed in any desired manner below or above the springs 52, 53 or beside the bridge carrier in any desired position, by the use of suitable connecting elements. In the diagrammatic illustration in FIGURE 7 the holder 60 is fastened slidably for example in slots in the bridge carrier, to enable taring of the balance to be carried out. The rack 61 is supported on springs slidable vertically in the direction of the bridge carrier to be able to take the lateral deflection of the bridge carrier 58 when the weighing machine is loaded.

The principle illustrated is not restricted to a particular type of a weighing machine but can be used in weighing machines for all purposes.

Figure 8:
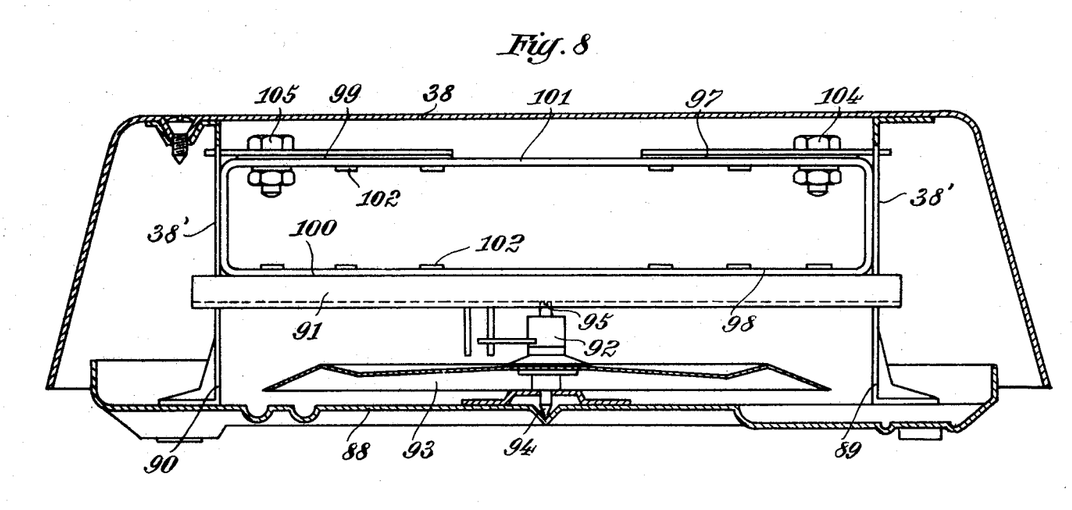
FIGURE 8 is a vertical section on the line VIII—VIII of FIGURE 9.
Figure 9:
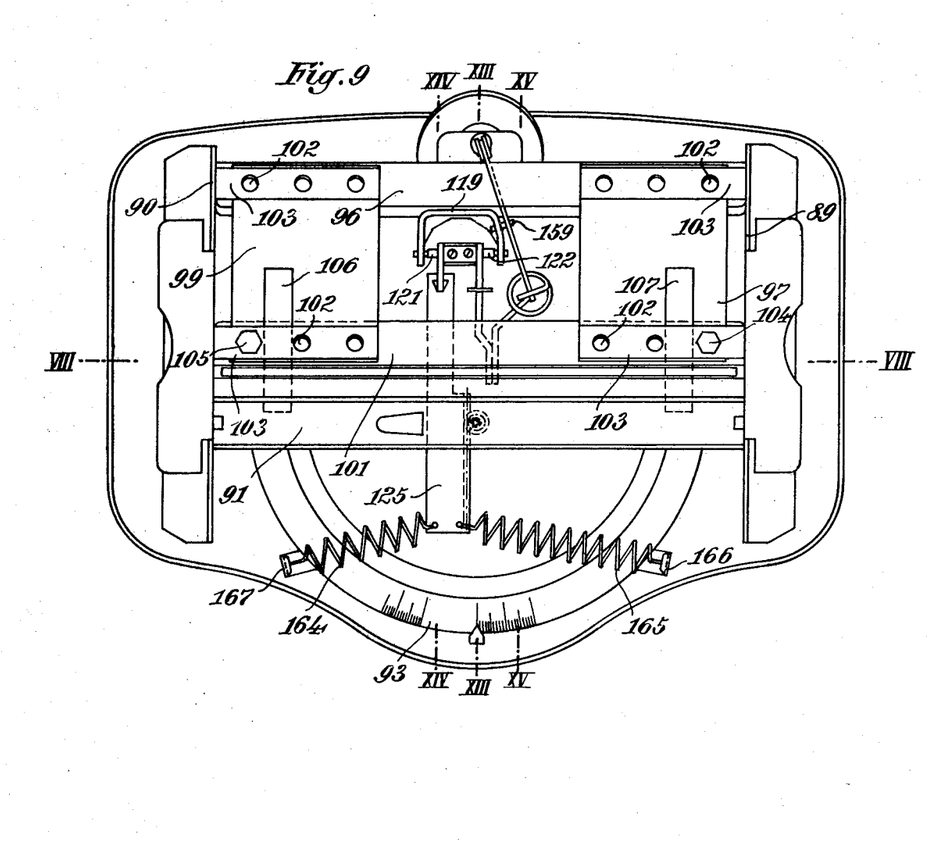
FIGURE 9 is a plan view of the weighing machine according to FIGURE 8, the upper part of the housing being removed.

The weighing machine shown in FIGURES 8 and 9 comprises a lower part 88, which is adapted to be erected on a base. On this lower part, a carrier 91 is supported by means of a side plate 89, 90 in order to mount the shaft of a dial 93, the said shaft being provided with a pinion 92. The ends 94, 95 of the shaft run in step bearings, a conical bearing being provided in the lower part 88 for the lower end 94.

The side plates 89, 90 also hold a distance means 96, on which two leaf spring pairs 97, 98 and 99, 100 are clamped symmetrically in relation to the longitudinal centre line of the weighing machine. The leaf springs 97, 98 can be seen also in FIGURES 13 to 15. The distance means 96 is also shown.

The ends of the leaf springs 97 to 100 remote from the distance means 96 are clamped in a bridge carrier 101 shaped substantially to correspond to the distance means 96. The upper part of the weighing machine denoted by reference 38 in FIGURES 1 to 3 is connected in this embodiment by means of the side plates 38' to the bridge carrier 101 which, as shown in FIGURE 8, has a box-shaped profile with vertical webs, on which the side plates 38' are fastened.

Figures 10, 11, 12, 13:
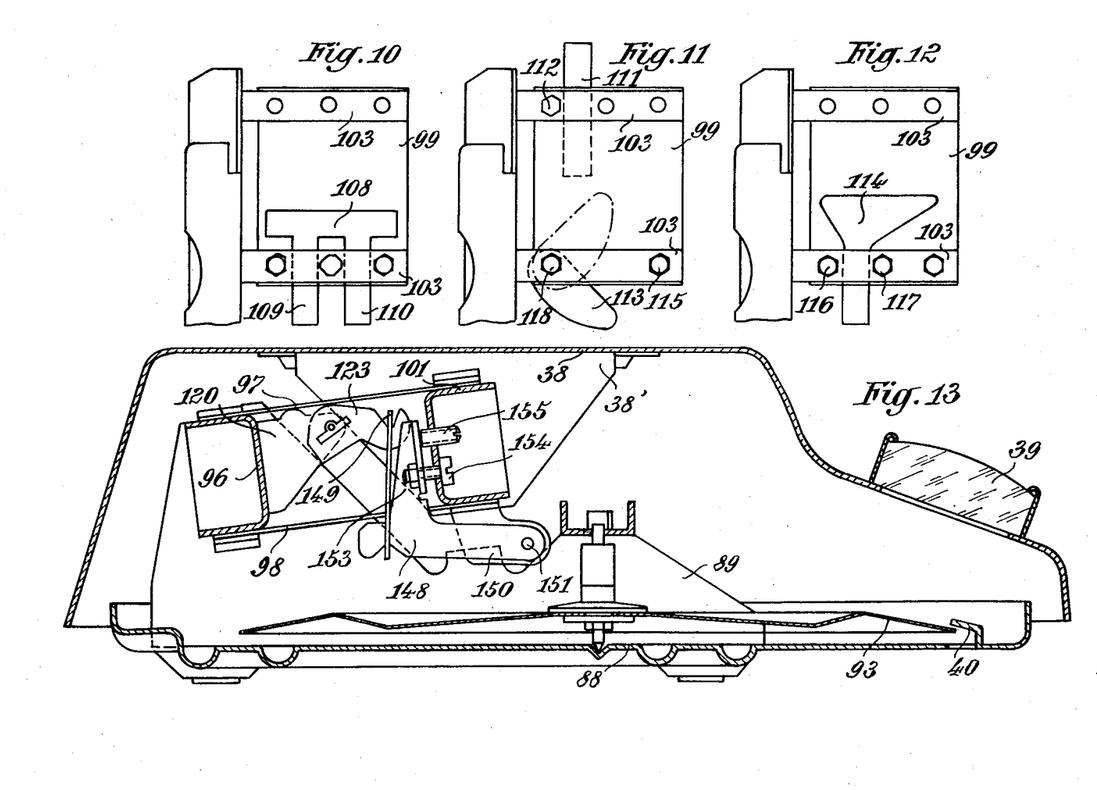
FIGURES 10, 11 and 12 are detail views in plan according to FIGURE 9 showing different embodiments of adjustment springs.
FIGURE 13 is a section on the line XIII—XIII of FIGURE 9.
Figure 14:
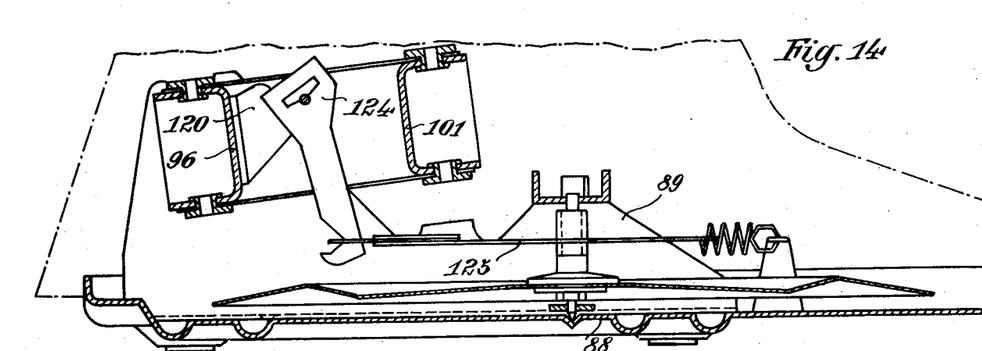
FIGURE 14 is a section on the line XIV—XIV of FIGURE 9.
Figure 15:
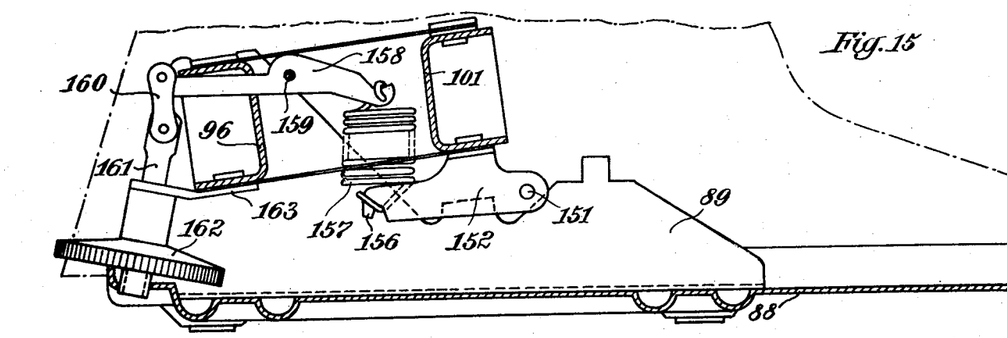
FIGURE 15 is a section on the line XV—XV of FIGURE 9.

From FIGURES 13 to 15 it will be seen that the distance means 96 and the bridge carrier have a substantially U-shaped profile. The arms of the profile part forming the distance means 96 are at the same time disposed at an angle in such manner that they lie in parallel relationship to the direction in which the straight leaf springs 97 to 100 extend at an angle upwardly towards the bridge carrier when the weighing machine is in the non-loaded state.

In the non-loaded state of the weighing machine the arms of the bridge carrier 101 lie practically in the extension of the arms of the distance means 96.

According to the embodiment illustrated, the fastening of the leaf springs 97 to 100 is effected largely by tubular rivets, which are denoted by reference 102 in FIGURES 8 and 9. The rivets 102 pass through the arms of the distance means and of the bridge carrier, and also through the leaf springs and clamping strips 103, for example on the sides of the leaf springs remote from the arms of the distance means and of the bridge carrier.

In the embodiment illustrated, the rivets are replaced by clamping screws 104, 105 only at the bridge carrier side ends of the leaf springs 97, 99, namely towards the sides of the weighing machine. These clamping screws therefore permit loosening of the clamping at the point in question, so that an adjujstment spring 106, 107 can be inserted between the leaf springs 97, 99 and the clamping strips 103. In the example illustrated, strip-shaped adjustment springs are shown, the length of which corresponds substantially to that of the leaf springs 97, 99, and which are inserted so that they extend over half the length of the leaf springs 97, 99. Since the adjustment springs lie on the upper side of the leaf springs 97, 99, they are jointly deflected on the deflection of the leaf springs, when the upper part of the housing is subjected to load, so that the characteristic of the leaf springs in question is varied according to the adjustment springs 106, 107 and the overlap distance.

It is pointed out that at the clamping end with the clamping screws 104, 105 it is also possible to replace two or all the rivets 102 by clamping screws, so that at the same time any desired lateral adjustment of the adjustment springs 106, 107 is possible. In particular, a plurality of strip-like adjustment springs can also be inserted side by side simultaneously.

FIGURES 10 to 12 show special embodiments of adjustment springs and adjustment spring arrangements. The illustration is given in each case with reference to the leaf spring denoted by reference 99 in FIGURE 9. This leaf spring belongs, for example, to the upper pair of leaf springs 97, 99. This leaf spring 99 is held at its ends in the clamping strips 103 and is fastened in the manner described, for example by rivets or screws.

According to FIGURE 10, the adjustment spring 108 has the same width as the leaf spring 99, while the end of this adjustment spring guided beneath the clamping strip is slotted or made in the form of a rake to correspond to the arrangement of clamping screws. This facilitates any desired adjustment of the leaf spring in the longitudinal direction.

From FIGURE 11 it will be seen that within the scope of the invention it is possible to provide adjustment springs not only in each case at one end of the leaf springs, but one or more adjustment springs at each end. By way of example, according to FIGURE 11, at one end at which the clamping strip 103 is fastened by means of two screws 115, 118 an adjustment spring 113 is provided, which can be turned after the style of an eccentric and which is so profiled that in dependency on its rocking-in movement it effects varying support of the leaf spring 99.

At the opposite end of the leaf spring 99, on the clamping strip 103 which is, moreover, fastened by rivets in the manner described, a clamping screw 112 is provided, and after this screw has been loosened the adjustment spring 111, which is constructed in the form of a strip for example, can be adjusted.

In view of the deflection of the leaf springs, according to the illustration in the drawing the adjustment spring 111 is disposed between the leaf spring and the distance means (not shown).

Corresponding combinations of adjustment spring may be provided at the lower leaf springs 98, 100.

It will be understood that the adjustment springs need not be rectangular, as shown in the case of 106, 107. By way of example, other contours may be provided, as is apparent from FIGURE 12. The essential part of the adjustment spring 114 illustrated is, for example, triangular. On the adjustment spring is a web which passes between two clamping screws 116, 117 between the leaf spring 99 and the clamping strip 103.

On the distance means 96 fixed on the housing, an axle is mounted parallel to the distance means 96 with the aid of a carrier 119 which has a substantially U-shaped profile and one arm of which in FIGURES 14 and 13 is denoted by reference 120. A rotatable sleeve 122 is situated on this axle.

On this axle is mounted an adjusting arrangement which comprises a combination of the upper pull-rod hook 123 and the rocking lever 124 for operating the rack 125.

The construction of this adjusting arrangement will be clear especially from FIGURES 16 to 20.

Figures 16, 17, 18, 19, 20, 22:
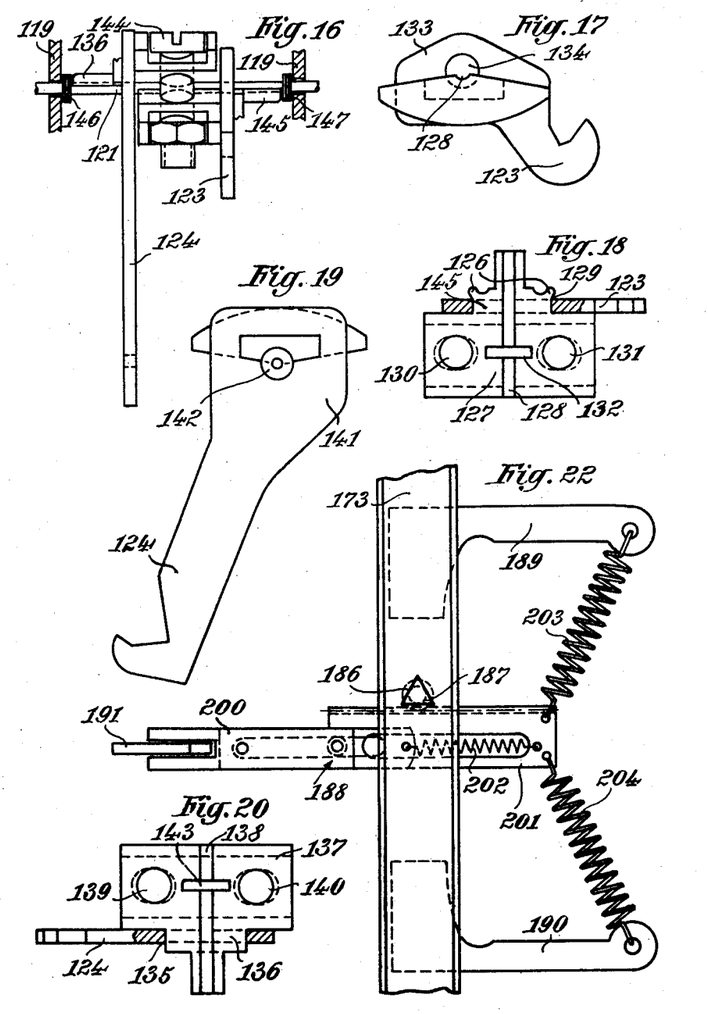
FIGURE 16 is a view on an enlarged-scale of the adjustment angle, seen vertically to the axis.
FIGURE 17 is a side view of the upper pull-rod hook of the arrangement according to FIGURE 16.
FIGURE 18 is a plan view of the pull-rod hook according to FIGURE 17.
FIGURE 19 is an elevation of the rocking lever of the arrangement according to FIGURE 16.
FIGURE 20 is a plan view of FIGURE 19.
FIGURE 22 is a plan view of a rack and pinion system employed in the weighing machine shown in FIGURE 21.

It will be seen that the upper pull-rod hook 123 is fastened on an axle bearing body 127 by means of rivets 126, which axle bearing body 127 has a bearing cup 128 for the sleeve 122. The axle bearing body 127 passes through an incision 129 in the upper pull-rod hook, so that the cup 128 extends on both sides of the pull-rod hook.

On either side of the cup 128 the axle bearing body has a bore 130, 131 in each case. Between the bores 130, 131 the axle bearing body 127 has an annular groove 132 concentric to the bearing cup 128. This annular groove is made narrow. The shank 133 of the upper pull-rod hook 123 also has a cut-out 134 which is provided in the region of the cup 128 and through which the axle 121 with its sleeve 122 can easily be passed.

The rocking lever 124 is constructed correspondingly. Its shank likewise has a profiled opening 135 for a projection 136 on an axle bearing body 137 with a cup 130 and two bores 139, 140. In the region of the cup, in this construction as well, the shank 141 is provided with an additional cutout 142.

In FIGURES 17 and 19 it will be seen that the surfaces of the axle bearing bodies adjacent to the cups 128, 138 are not in line with one another but are drawn back so that on assembly, as shown in FIGURE 16, there is in each case a gap between the axle bearing bodies. This gap continues with a linear decrease as far as the cups which are in each case not of semicircular construction, but extend along a correspondingly smaller part of an arc of a circle.

According to the conical gaps, therefore, an angle adjustment of the upper pull-rod hook 123 with respect to the rocking lever 124 is possible. Accordingly, the bores 130, 131 and 139, 140 respectively are made conical in such manner that they widen out, at least in a plane vertical to the bearing cups 128, 138, towards the side of the axle bearing body remote from said bearing cups.

When the axle bearing bodies according to FIGURE 16 are clamped onto the axle 121, which need not have an additional bush but may be mounted so as to be rotatable itself in the carrier 119, one or, for example, two rings are slipped onto the axle 121. The axle bearing bodies 127 and 137 are then pressed on from different sides, so that the axle 121 lies in the cups 128, 136 and the rings engage the groove 132 and a groove 143 of corresponding construction in the axle bearing body 137. Screw bolts, one of which 144 is shown in FIGURE 16 are thereupon passed through the opposite openings 130, 139 and 131, 140 respectively. By uniformly tightening the screw bolts, it is possible to obtain a mutual adjustment of the axle bearing bodies, in which the gaps between the bodies are about equal on both sides of the axle. The tightening of one and the loosening of another screw then permits an angle adjustment of the upper pull-rod hook 123 with respect to the rocking lever 124.

From FIGURE 16 it will be seen that the projections 136 and 145 respectively passing through the shanks of the upper pull-rod hook 123 and rocking lever 124, project close to the arms of the carrier 119 so that with the insertion of spring rings 146, 147, lateral guidance can simultaneously be obtained.

A further possibility of adjustment is provided by the rockable arrangement of the lower pull-rod hook 148. The lower pull-rod hook is connected to the upper pull-rod hook 123 by the pull-rod 149, FIG. 13. It is constructed as an angle lever, its arc 150 extending substantially horizontally below the bridge carrier 101 and is adapted to turn about a pivot pin 151. As will be apparent from FIGURE 15, this pivot pin is disposed on a strut 152 which may for example be fastened on the lower arm of the bridge carrier 101.

The other arm 153 of the lower pull-rod hook 148 extends in approximately parallel relationship to the web of the bridge carrier 101. The edge facing this web is advantageously bent-off and has an opening through the web of the bridge carrier 101. A pressure screw 155 is also disposed in a threaded hole in the web of the bridge carrier 101 and presses on the bent-off part of the arm 153. By loosening or tightening the screws 155, 154, rocking of the lower pull-rod hook 148 about the pin 151 is produced. Since the pin 151 lies on the side of the bridge carrier 101 remote from the leaf springs, this gives an adjustment of the lower pull-rod hook 148 which lies on an approximately vertical part of an arc of a circle.

At its bent-off end remote from the pin 151, the strut 152 has a hook 156 in which one end of the taring spring is suspended from a double-armed rocking lever 158. As shown in FIGURE 9, the rocking pin 159 is disposed for example on the carrier 119. The end of the lever 158 remote from the taring spring passes through a slot in the web of the distance means 96 and connected by an intermediate linkage 160 to the shank of a taring screw 161. The latter passes through a taring knurled nut 162, which is accessible from the back of the upper part and which partly projects through a slot in the upper part. The taring knurled nut 162, which is accessible from the back of the upper part and which partly projects through a slot in the upper part. The taring knurled nut 162 is mounted by means of a stirrup 163 for example on the fixed distance means 96.

The lever 124 is suspended in the rack 125. The latter meshes with the pinion 92. The end of the rack remote from the rocking lever 124 is suspended from two springs 164, 165 lying in a V-arrangement in relation to one another. The angle between the springs is relatively large and an obtuse angle. By this arrangement of the springs, the rack 125 is practically completely free of any axial load, that is to say a load lying in the direction of adjustment, so that the reaction resulting from the suspension of the rack in the known constructions is avoided.

The abutments 166, 167 for the springs 164, 165 are fastened on the lower part 88 and are adjustable. They are, for example flexible straps. When use is made of two identical springs 164, 165, the spring 165 can be tensioned to a greater degree in order to adjust the tooth flank pressure between the rack 125 and the pinion 92.

The abutments for the springs holding the rack may be constructed as separate parts and disposed on the carrier 91. By way of example, the carrying arms then project substantially horizontally away from the carrier 91. They are weakened in cross-section at a point free from the carrier 91, in order to permit bending for adjustment of the tension of the springs, for example in accordance with the springs 164, 165.

It is pointed out that the spring abutments, which are formed on the supporting arms and denoted by references 167 and 166 in FIGURE 9, lie higher than the rack, so that the anchored outer spring ends are directed upwardly at an angle and thus take the weight of the rack.

Figure 21:
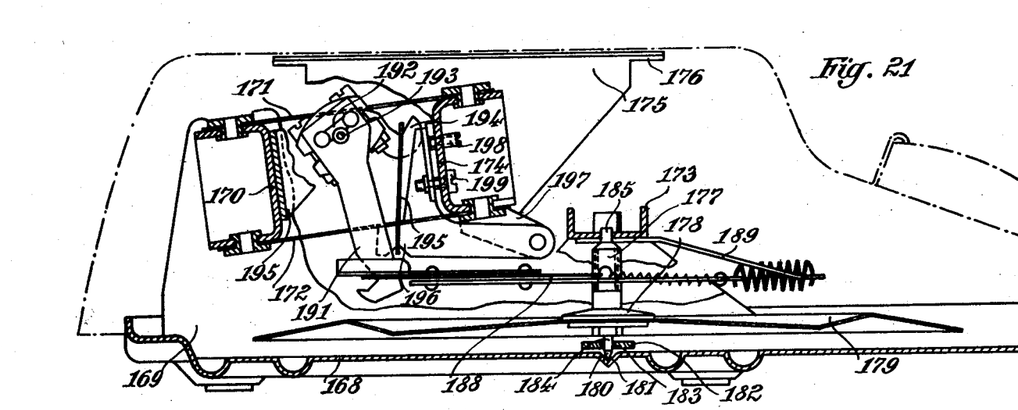
FIGURE 21 is a side view of a construction of a weighing machine according to the invention, in section with parts broken away.

The weighing machine shown in FIGURE 21 comprises a base plate 168 on which with side carriers 169 a distance means 170 is supported as an abutment for a parallel spring system 171, 172, and a cross carrier 173 for mounting the indicating system. The ends of springs 171, 172 remote from the distance means 170 are fastened on the bridge carrier 174, on which the weighing bridge 176, which is constructed as an upper housing plate, is supported by substantially triangular side plates 175. The ends of the spring are each fixed by rivets.

Between the base plate 168 and the bridge carrier 173 is mounted the indicating system. This comprises a vertical shaft, which has a pinion at its upper part 177 and which at its lower part 178 carries a dial 179 disposed between supporting plates and fixed by a screw connection. The lowermost end of the shaft is tapered and has a bearing point 180, which fits in a pointed indentation 181, formed directly in the base plate 168. The point angle of the indentation 181 is larger than that of the point 180. For securing purposes, a strip 182 is disposed rigidly on the base plate in the region of the indentation 181 and spaced therefrom. Said strip has an opening 183 above the indentation 181. The diameter of the opening is longer than that of the pivot 184 above the point 180.

At the upper end is a pivot 185 which projects through a triangular stamped-out part 186 shown in FIGURE 22.

The inner circle of this stamped-out part is dimensioned according to the bearing dimensions for the pivot 185. One side 187 of the stamped-out part extends in parallel relationship to the direction of movement of the rack arrangement 188 driving the pinion. The triangular stamped-out part 186 preferably has the form of an equilateral triangle.

The rack arrangement 188 is suspended on the one hand from carrying arms 189, 190 fastened on the cross-carrier 173, and on the other hand from a rocking lever 191. Between the supporting arms 189, 190 and the rack are provided springs 203, 204, in a V-arrangement. The rocking lever 191 engages by a lower hook and directly in an opening in the rack.

The rocking lever 191 is part of the transmission system and forms a part of the adjustment arrangement denoted as a whole by reference 192. Said angle is formed by a supporting shaft 193, on which the rocking lever 191 and the upper pull-rod hook 194 are disposed, the angle between the shaft, lever and hook being adjustable. The shaft 193 is supported on the distance means 170 by bearing arms 195. From the upper pull-rod hook 194 a pull-rod 195 extends to the lower pull-rod hook 196, which is articulated on the arm 197 fastened on the bridge carrier 174 and the angle position of which is adjustable in relation to the pull-rod hooks by means of screws 198, 199.

According to the construction shown in FIGURES 21 and 22, the rack arrangement 188 comprises the parts 200, 201, which are guided one inside the other by a slot guide and are fastened to one another by a spring 202. The latter is a tension spring and draws the parts 200, 201 together against an inner stop, so that there is a defined length of the rack available for the indication.

It is pointed out that the force of the spring 202 is stronger than the action of the tension springs 203, 204, so that the rack arrangement is in each case contracted and finds its stop independently of the deflection of these springs.

If in the embodiment described, a load is applied with an impact to the weighing bridge 176, the rocking lever rocks in the clockwise direction in consequence of the transmission 174, 197, 196, 195, 194, 192 and exerts a tractive force on the part 200 of the rack arrangement. In consequence of the considerable inertia of the dial, the part 201 is prevented from following an instantaneous movement, so that the parts 200, 201 are drawn apart with expansion of the spring 202. According to the acceleration, the indicating system then moves, the part 201 being drawn by the spring 202 against a stop between the parts 201 and 202 and at the same time the springs 203, 204 being correspondingly expanded. In this way not only is the stress on the indicating system and the transmission elements reduced, but at the same time a more damped movement of the indicating system is achieved, so that ultimately the weighing machine settles into its final position more rapidly.

Figures 23, 24:
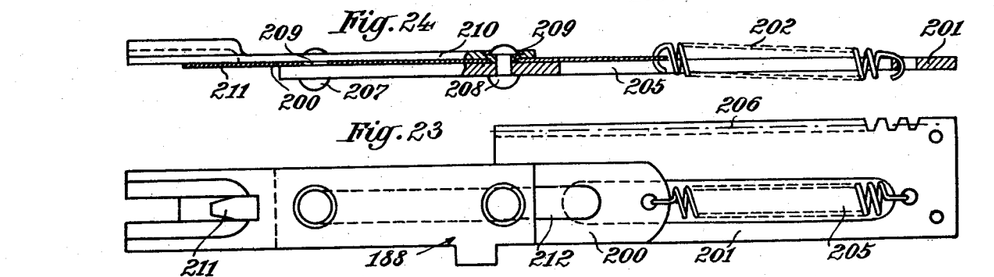
FIGURE 23 is a plan view of the rack according to FIGURES 21 and 22 on a larger scale.
FIGURE 24 is a side view of FIGURE 23.

The rack arrangement 188 is shown on a larger scale in FIGURES 23, and 24. The part 201 has a slot 205 in which the spring 202 is disposed. The rack 206 is disposed on the part 201, and the part 201 continues beyond the rack part 206 and is connected by rivets 207, 208 for example to a guide part 210 held at a distance by projections 209. In the intermediate space created, the part 200 is guided, in the end openings 211 of which the lower hook of the rocking lever engages. The projections 209 pass through a slot 212 in the part 200. In the embodiment illustrated, the parts 200, 201 are contracted, so that the left-hand projection 209 lies at the end of the slot. This provides a defined stop, which fixes a determined length of the rack arrangement 188 with the spring 205 contracted and thus ensures exact indication. It is clear that the part 200 cannot be drawn to the left until the end of the slot 212, visible in FIGURE 23, reaches the right-hand stop 209.

The invention, which generally provides the arrangement of an element extensible under over-load, can be embodied in a different manner from the rack arrangement illustrated.

Figure 25:
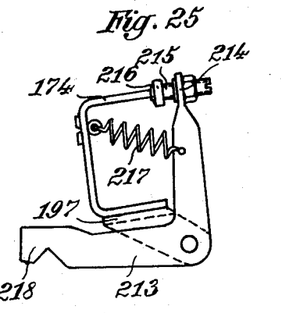
FIGURE 25 is a side view of a modified construction of an adjustment part shown in FIGURE 21.

FIGURE 25 shows a special embodiment of the arrangement of the lower pull-rod hook denoted by reference 196 in FIGURE 21. This pull-rod hook is shown by reference 213 in FIGURE 25. In accordance with the construction shown in FIGURE 21, it is rockably pivoted by the arm 197 on the bridge carrier 174 which, in order to simplify the illustration, is shown without the springs 171, 172 in FIGURE 25. The lower pull-rod hook 213 is constructed as an angle lever, the upwardly projecting arm facing away from the actual hook. At its end, this arm has a stop plate 214 which is traversed by an adjustable stop element 215 which may be constructed as a set screw. A co-acting stop 216 is fastened on the bridge carrier 174. A tension spring 217 disposed between the lower pull-rod hook 213 and the bridge carrier 174 draws the stop element 215 against the co-acting stop 216, so that a defined position of the lower pull-rod hook 213 in relation to the bridge carrier 174 is obtained. It is clear that in the event of a load being applied with an impact, that is to say in the event of a corresponding movement of the bridge carrier 174, the lower pull-rod hook 213 rocks in the clockwise direction if the transmission system acting at 218 cannot follow this abrupt movement sufficiently rapidly, for example owing to inertia of the indicating system. The same advantages are obtained as in the construction according to FIGURES 21 and 22, although a known completely rigid rack can be used. The advantage obtained additionally by the construction according to FIGURE 22 lies in a simultaneous screening of the adjustment angle 192 from harsh impacts.

Figure 26:
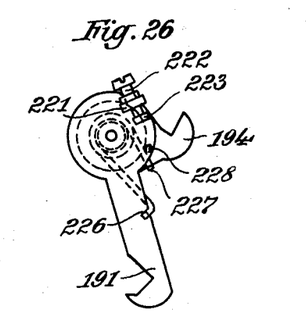
FIGURE 26 is a side view of a modified construction of an adjustment part of the weighing machine according to FIGURE 21.
Figure 27:
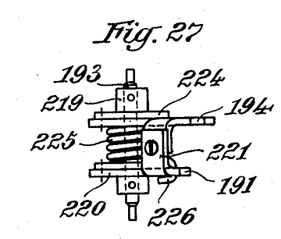
FIGURE 27 is a plan view of FIGURE 26.

FIGURES 26 and 27 show a further embodiment of the invention in which the elastic resilience in the case of loads applied with an impact is transmitted to the adjustment angle arrangement 192. In accordance with FIGURE 21, the adjustment angle is constituted by the upper pull-rod hook 194 and the rocking lever 191. In this embodiment the upper pull-rod hook 194 is fastened by means of an arrangement not shown in detail, so as to be rigid with respect to rotation, on a hub 219 disposed on the supporting shaft 193. The rocking lever 191 is mounted on this shaft so as to be able to turn. A collar 220, which surrounds the hub and which is constructed in one piece with the rocking lever, carries an abutment plate 221, which extends substantially parallel, to the hub 219 and through which passes a stop member 222 constructed as a set screw for example. This top member cooperates with a stop 223, which is mounted rigidly on a collar 224 of the upper pull-rod hook 225. Between the collars 220, 224 a spiral spring 225 engages around the rocking lever 119 and the other end 227 is supported against a stop 228 on the upper pull-rod hook 194 or the collar 224. The spiral spring thus produces a rotation of the rocking lever 119 in the clockwise direction so that the stop member 222 and the stop 223 are brought into mutual contact and there is a defined adjustment of the adjustment angle arrangement 192.

When the adjustment angle arrangement according to FIGURES 26 and 27 is used in the weighing machine according to FIGURE 21, which may then have a one-piece rack known per se, an abrupt loading of the weighing bridge is transmitted to the upper pull-rod hook 194 by way of the lower pull-rod 196 and the pull-rod 195. The upper pull-rod hook is thus drawn down, so that the stop 223 is lifted from the stop 222 with simultaneous tensioning of the spring 225, if the rocking lever 191 is first held in its position or can move only relatively slowly owing to the inertia of the indicating system. The spring 223, however, gradually guides the rocking lever 191 according to the movement of the upper pull rod hook 194, until the stop member 222 and the stop 223 against one another and hence the exact adjustment of the transmission system is available for the weight indication.

Figure 28:
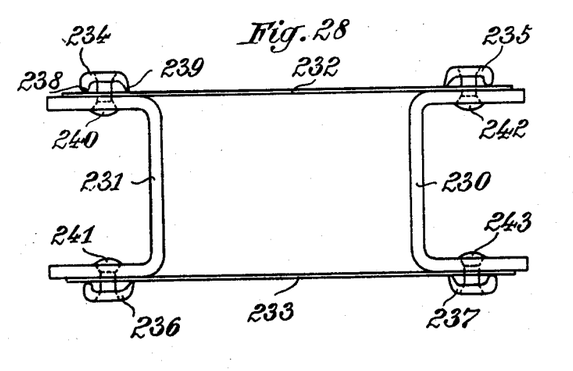
FIGURE 28 is a side view showing a preferred arrangement for a clamping of the leaf spring.

In FIGURE 28 there is shown in side view a special construction of a clamping means for the leaf springs, on the one hand on the bridge carrier 2 in FIGURE 1 or the bridge carrier 101 in FIGURE 13, and on the other hand on the distance means 231, which in FIGURE 1 is denoted by reference 5 and in FIGURE 13 by reference 96. The references to the earlier figures are made in order to explain the arrangement of the parts of the weighing machine referred to in FIGURE 28. In FIGURE 18 two parallel leaf springs are denoted by references 232 and 233. Instead of the clamping strips 103 shown in FIGURE 9 for example for clamping the leaf springs, according to the preferred embodiment. These strips are disposed on the springs in such manner that the cavity of the profile faces the springs, so that two defined clamping lines are obtained at the webs 238 and 239. The web 238 facing the respective spring and may have a rounded end, while the web 239 preferably has an end in the form of a knife-edge or tapered end. The profile strips 234 to 237 are fastened for example by means of rivets 240, 241, 242, 243. Each strip has a plurality of, for example three hollow rivets—or clamping screens where use is made of adjustment springs, for example, as shown in FIGURE 9—for clamping the springs on the parts 230, 231. The advantage of this clamping system is that the web 239 facing the respective spring arm provides a sharply defined clamping edge. This edge presses over the entire length of the strips 234 to 237 with the same intensity owing to the profiling of these strips, even if, for example, only three fastening elements constructed as rivets or screens are provided.

It is important that the clamping edge provided by the web 239 should act on the parts 231, 230 in the rectilinear region of the contact surfaces, so that there may not be any deformation of the springs for example at the rounded portions.

I claim:

1. In a weighing device, a frame, a bridge, parallel leaf spring means connecting said bridge to said frame for parallel movement of said bridge, first lever means, second lever means, pivot means rotatably connecting said first and second lever means to said frame, first adjustment means inter-connecting said first and second lever means at an adjustable angle with each other, bracket means, second adjustment means connecting said bracket means to said bridge and adapted to permit adjustment of the position of said bracket means in two perpendicular directions relative to said bridge, first bearing means on said first lever means, second bearing means on said bracket means substantially below said first bearing means, connecting link means supported on said first and second bearing means to transmit movement of said bridge to said first and second lever means, dial disc means, axle means rotatably connecting said dial disc means to said frame, gear means secured to said dial disc means for rotation about the axis of said axle means, gear rack means in meshing engagement with said gear means, third bearing means on said second lever means, means rockably connecting said gear rack means with said third bearing means, and spring means connecting said gear rack means with said frame to bias said rockable connecting means against said third bearing means.

2. The weighing device set forth in claim 1, in which said pivot means comprises a shaft pivotally mounted in said frame, a first bearing member secured to said first lever means and having bearing surface means partly surrounding said shaft, a second bearing member secured to said second lever means and having bearing surface means partly surrounding said shaft opposite said first bearing member, said first and second bearing members extending transversely of said shaft at opposite sides thereof, and adjustable means connecting said extensions together at opposite sides of said shaft, whereby the angle between said first and second lever means is variable by adjustment of said connecting means to vary the angle between said first and second bearing members.

3. The weighing device set forth in claim 2, including oppositely inclined engagement surfaces on one of said bearing members at a transverse distance from said shaft, and separate adjustable means on the other of said bearing members for engagement with said inclined engagement surfaces, whereby the angular inter-relation between said first and second bearing members is adjustable by means of said separate adjustable means when said adjustable connecting means are released.

4. The weighing device set forth in claim 1, in which said second lever means comprises two elements, guide means on one of said elements in which the other element is displaceable longitudinally of said second lever means, and fastening means for securing said elements together in any selected displacement position, whereby the length of said second lever means is adjustable.

5. The weighing device set forth in claim 1, in which said second adjustment means comprises screws which are substantially perpendicular to each other.

6. The weighing device set forth in claim 1, in which said first and second lever means are disposed in the space between two pairs of leaf spring means laterally separated from each other.

7. The weighing device set forth in claim 1, including support means, screw means screwably connected with said frame in engagement with said support means to move said support means substantially parallel with the direction of movement of said bridge, and yieldable means connecting said support means with said bridge, whereby said screw means permit tare setting of said bridge.

8. The weighing device set forth in claim 1, including auxiliary leaf springs extending partly along said leaf spring means in close engagement therewith, and means for securing said auxiliary leaf springs in variable positions to cover a selective area of said leaf spring means.

9. The weighing device set forth in claim 1, including auxiliary strip-shaped leaf springs extending partly along said leaf spring means in close engagement therewith, and means for securing said auxiliary leaf springs in variable positions to cover a selective area of said leaf spring means.

10. The weighing device set forth in claim 1, including auxiliary substantially triangular leaf springs extending partly along said leaf spring means in close engagement therewith, and means for securing said auxiliary leaf springs in variable positions to cover a selective area of said leaf spring means.

11. The weighing device set forth in claim 1, in which said leaf spring means are substantially sinusoidal longitudinally and adapted to assume a substantially straight shape under half load on the bridge.

12. The weighing device set forth in claim 1, in which said gear rack means comprises a first section and a second section, means interconnecting said first and second sections for relative movement longitudinally, interengaging stop means on said first and second sections to limit relative movement thereof in the extending direction, and resilient means interconnecting said first and second sections to bias said sections in the contracting direction, whereby the effect of impact loading of the bridge upon said dial disc means and associated parts is softened.

13. The weighing device set forth in claim 1, in which said spring means connecting the gear rack means with said frame is disposed out of alignment with said gear rack means in such a direction as to bias said gear rack means towards meshing engagement with said gear means.

14. The weighing device set forth in claim 1, in which said spring means connecting said gear rack means with said frame comprises two tension springs extending in V-shape from said gear rack means.

15. The weighing device set forth in claim 1, in which said spring means connecting said gear rack means with said frame comprises two tension springs extending in V-shape from said gear rack, the force exerted by the tension spring extending outwardly on the side of the rack teeth exceeding that of the other tension spring.

16. The weighing device set forth in claim 1, including thrust bearing means in said frame for the lower end of said axle means, and bearing means in said frame for the upper end of said axle means, said last mentioned bearing means comprising a triangular opening in the frame having one side of the triangle parallel with the direction of movement of said gear rack means.

References Cited in the file of this patent

UNITED STATES PATENTS 2,036,635     Kingsbury _______________ Apr. 7, 1936

FOREIGN PATENTS 550,365     Germany _______________ May 12, 1932
758,544     Great Britain ____________ Oct. 3, 1956